Nov. 7, 1972  D. HULL  3,702,183
GRAIN DRIER
Filed Feb. 10, 1971  4 Sheets-Sheet 4

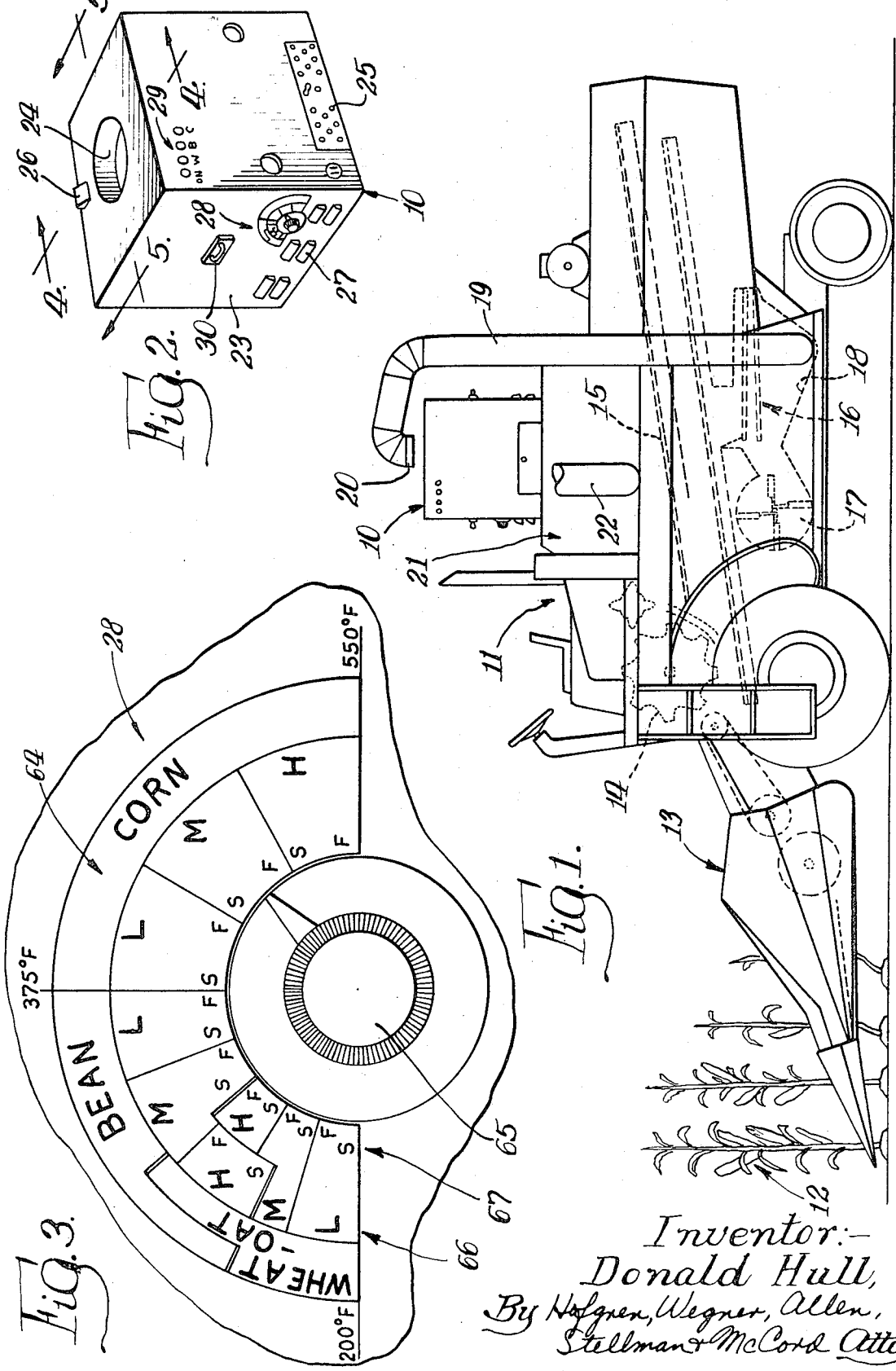

United States Patent Office 3,702,183
Patented Nov. 7, 1972

3,702,183
GRAIN DRIER
Donald Hull, Baylis, Ill., assignor to Mobile Dry, Inc.
Filed Feb. 10, 1971, Ser. No. 114,146
Int. Cl. F27b 5/00
U.S. Cl. 263—41                                    20 Claims

ABSTRACT OF THE DISCLOSURE

A grain drier for drying moist granular crops, such as wheat, oats, beans, corn, etc. The drier includes a drying chamber through which the grain is passed while being heated to a high temperature for a short period of time thereby to remove moisture therefrom. The dried grain is delivered from the drying chamber for delivery to a grain hopper or the like. The drier may be carried on a conventional combine. The drier includes means for adjusting the operating temperature suitably for different types of grain.

BACKGROUND OF THE INVENTION

Field of the invention

This invention relates to harvesting apparatus and in particular to apparatus for drying grain.

Description of the prior art

It has been found that large quantities of grain crops cannot be satisfactorily stored when moist. Illustratively, corn has been found to tend to spoil where the moisture content thereof is over approximately fifteen percent by weight. Further, price penalties are applied where the grain is relatively moist because of the presence of the undesirable moisture. Still further, vagaries of climate often preclude the late harvesting of many crops making it desirable to harvest the crops while yet relatively green and moist.

To overcome these problems, it is common to partially dry the grain during the harvesting operation. Conventionally, the grain is harvested by a combine which delivers the grain to a suitable truck or wagon. The grain is then transported to a batch-type drying apparatus wherein the grain is heated to reduce the moisture content therein to a preselected level. The grain is then cooled and transferred from the drier to the hopper or other storage facility.

Such conventional drying of the grain is relatively expensive and time consuming. Where manpower is limited, the time consumption problem is aggravated because of the need to stop the harvesting operations to permit the available personnel to conduct the drying operations.

Another serious disadvantage of the conventional drying apparatus is the inability thereof to provide a uniformity in the drying operation at low cost. While relatively expensive complex driers have been developed to provide reasonable uniformity, such driers are relatively large and effectively preclude utilization thereof at the harvesting site. It has, therefore, been a desideratum to provide a relatively small efficient grain drier capable of utilization in the field for drying harvested grain concurrently with the harvesting operation to avoid duplication of handling efforts and minimizing time and expense in the overall harvesting and provision of suitably dry grain.

SUMMARY OF THE INVENTION

The present invention comprehends an improved grain drier adapted for use in the field such as by mounting thereof on the conventional harvesting combine. The harvested grain may be delivered directly into the drier so as to pass therethrough. The grain is dried to a suitable degree in the drier for delivery from the drier as desired.

The drier of the present invention may be operated at a relatively high temperature with the grain passing through the drier relatively quickly to avoid undesirable heat deformation of the grain while yet providing optimum efficiency in the drying operation. The drier utilizes radiating walls transferring heat from the heat source to the chamber by conduction along the walls and convection of heat from the walls upwardly through the chamber. The drier further includes a plurality of cross members extending across the chamber in a staggered pattern such that the grain, in falling through the chamber, must impinge on one or more of the cross members for improved heat transfer thereto in maximizing efficiency of the drying operation. The cross members may comprise tubes in thermal transfer association with the side walls of the chamber so as to be at slightly higher temperature than the air within the chamber. Thus, the drier may be operated at a range of from approximately 200° F. to 500° F. in drying different grain crops such as wheat, oats, beans, and corn.

The drier includes improved control means for facilitated selection of the drying conditions for use with the different types of grain and includes suitable indicia for correlating the operating temperature with the type of grain to be dried so as to cause selectively a heating of the grain as a direct function of the amount of moisture in the grain and the desired rate of moisture removal, or as an inverse function thereof. The control further includes means for indicating the operating conditions of the drier as a function of the different ranges suitable for the different grains.

BRIEF DESCRIPTION OF THE DRAWING

Other features and advantages of the invention will be apparent from the following description taken in connection with the accompanying drawing wherein:

FIG. 1 is a side elevation of a combine provided with a grain drier embodying the invention;

FIG. 2 is a perspective view of the grain drier;

FIG. 3 is a fragmentary enlarged elevation of the control panel;

DESCRIPTION OF THE PREFERRED EMBODIMENT

Figure 4:
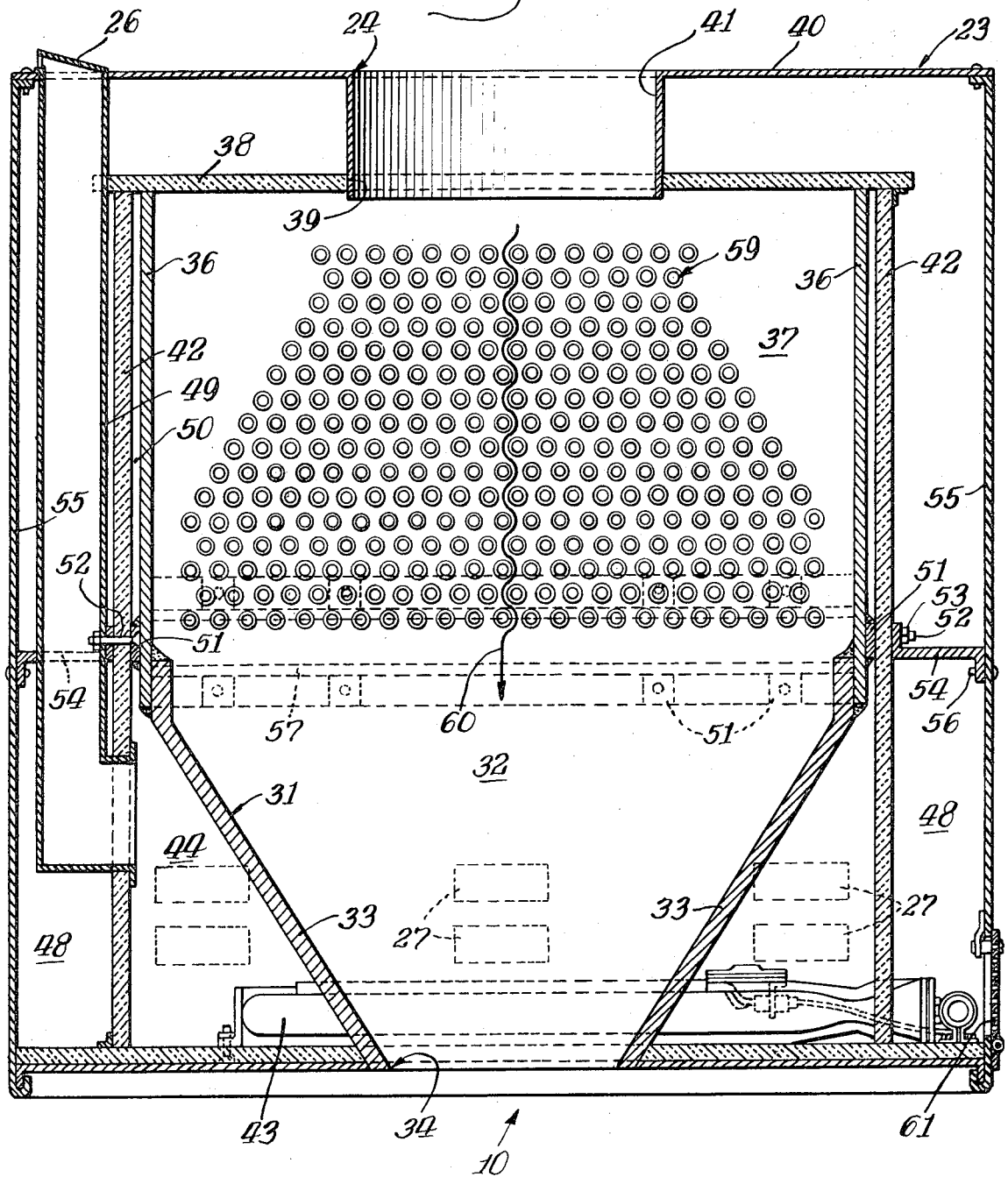
FIG. 4 is an enlarged vertical section taken substantially along the line 4—4 of FIG. 2.

In the exemplary embodiment of the invention as shown in the drawing, a grain drier generally designated 10 is shown to be mounted on a conventional harvesting apparatus, or combine, 11 adapted to harvest granular crops, or grain, 12. In the illustrative embodiment of FIG. 1, the grain is shown to be corn, it being understood that other suitable crops such as wheat, oats, beans, etc. may be dried with apparatus 10 as desired. Thus, combine 11 includes a cutting mechanism 13 adapted to cut ears of corn from the stalks and means 14 for threshing the grain, and means 15 for separating the grain. Screens 16 and a forced air circulator 17 are further provided for preparing the grain for delivery from a well 18 by conveyor 19 to discharge duct 20 overlying the drier 10. The dried grain is delivered to a hopper 21 for suitable delivery through a discharge conveyor 22 as desired.

Drier 10 includes an outer housing 23 having an upper inlet 24 for receiving the grain from the discharge duct 20. As shown in FIG. 2, the housing defines a perforated portion 25 for delivering combustion air into the drier and an outlet vent 26 for conducting products of combustion from the drier. The housing is maintained at a relatively low temperature such as over 150° F. by means of cooling air delivered inwardly through suitable louvers 27. Control of the drying operation is effected by a manual control 28 provided at one side of the housing and suitable indicating means 29 carried on the front of the housing. Suitable handles 30 may be provided for transporting the drier as desired.

Figure 5:
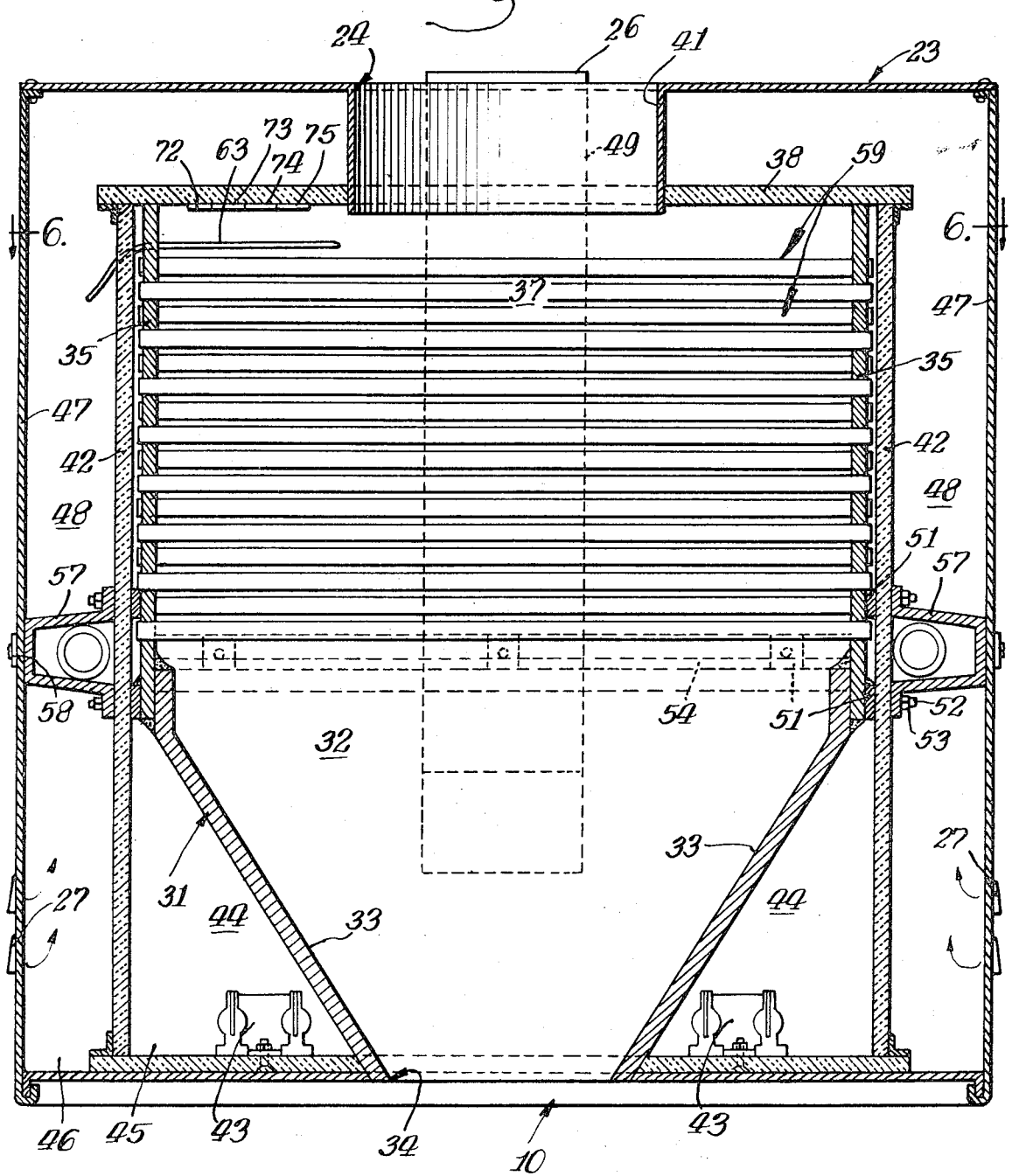
FIG. 5 is an enlarged vertical section taken substantially along the line 5—5 of FIG. 2.
Figure 6:
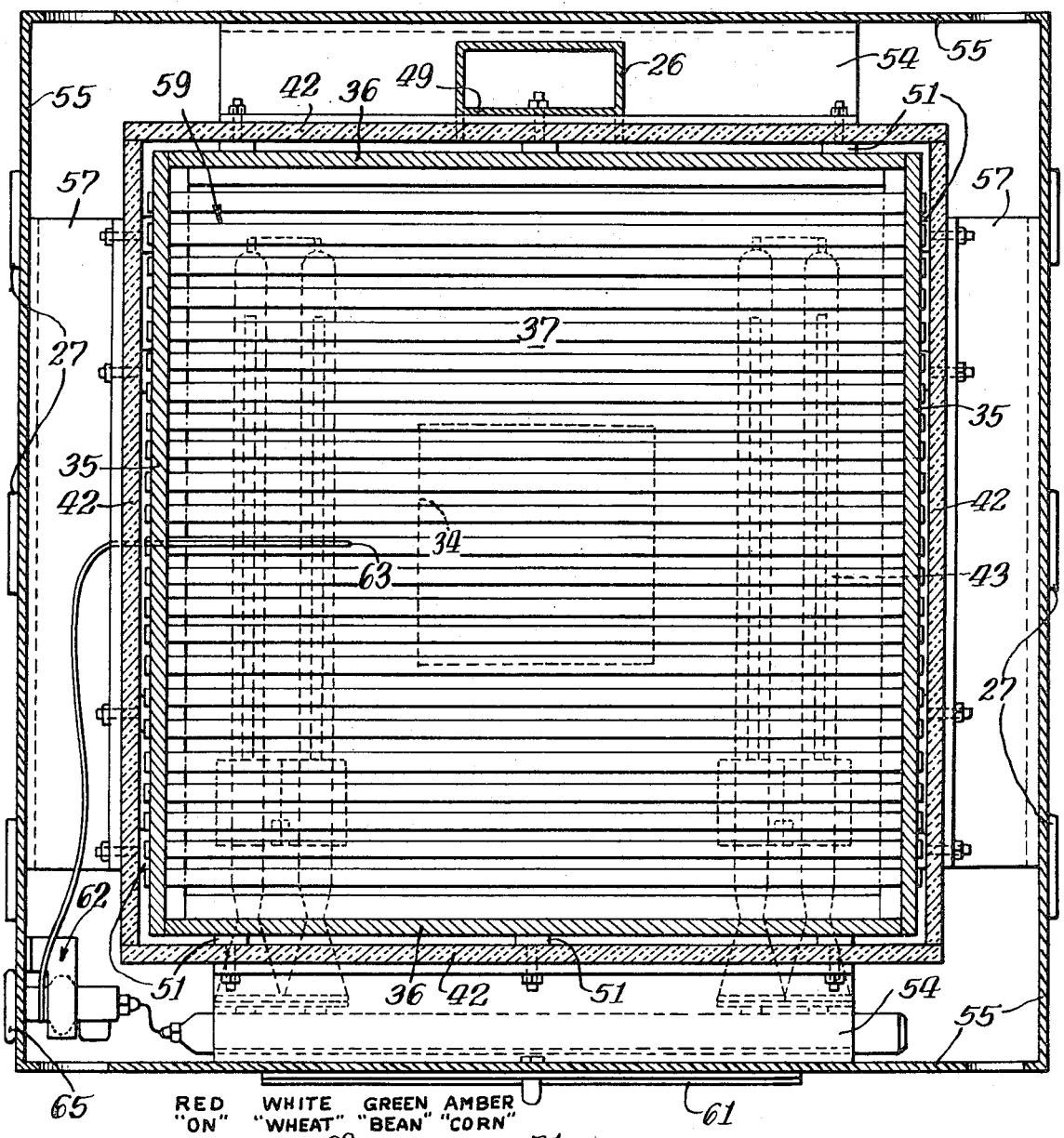
FIG. 6 is a horizontal section taken substantially along the line 6—6 of FIG. 5.

More specifically, as best seen in FIGS. 4, 5, and 6, drier 10 includes inner wall means generally designated 31 defining a drying chamber 32. Wall means 31 is defined by four downwardly inclined plates 33 defining at their lower ends an outlet opening 34. The upper ends of plates 33 are welded to two opposite side wall plates 35 and two side wall plates 36 defining a horizontal square cross-section upper drying chamber portion 37. The top of the drying chamber is closed by a top plate 38 having a central opening 39. Outer housing 23 includes a top wall 40 defining a depending duct 41 extending downwardly through drying chamber top wall opening 39 for conducting the grain from discharge duct 20 downwardly into drying chamber 32. Duct 41 defines the upper inlet 24 as best seen in FIG. 4.

Top plate 38 may be formed of a suitable insulating material such as "Transite" and is carried on four upright "Transite" side walls 42 spaced outwardly of drying chamber side walls 35 and side walls 42 spaced outwardly of drying chamber side walls 35 and 36. Conventional gas heaters 43 are disposed in the spaces 44 subjacent bottom walls 33 of inner wall means 31 and inwardly of side walls 42 above a bottom wall 45 carried on a bottom wall 46 of housing 23. Housing 23 further includes side walls 47 spaced outwardly of insulating walls 42 to define a cooling air space 48 within the housing for maintaining the housing at a relatively low temperature at all times. For this purpose, louvers 27 are provided in the side walls for introducing cooling air to space 48.

A vent duct 29 is connected between space 44 and vent outlet 26 rearwardly of the drying chamber, as best seen in FIG. 4, for conducting the products of combustion from burners 43. The products of combustion are prevented from passing upwardly into the space 50 between drying chamber walls 35 and 36 and insulating walls 42 by a set of spacer bars 51 welded to the drying chamber upright walls 36. The bars are suitably recessed to receive the heads of bolts 52 which are extended outwardly through the insulating walls 42 for receiving suitable nuts 53 to secure the drying chamber walls to the insulating walls in spaced relationship. A pair of Z-brackets 54 are secured to the housing side wall 55 by suitable means, such as screws 56, and to the insulating walls 42 by the nuts 53 on bolts 52 as shown in FIG. 4 to secure the insulating walls to the housing walls in spaced relationship. A pair of U-shaped brackets 57 are secured to the housing walls 47 by suitable means, such as screws 58, and a pair of spacer bars 51 are welded to the drying chamber walls 35 for connection to the legs of the brackets 57 by bolts 52 and nuts 53 as shown in FIG. 5 to secure the insulating walls 42 in spaced relationship to the housing walls 47.

Extending across chamber portion 37 is a plurality of cross members 59 having their opposite ends secured as by press fitting in side walls 35 of the drying chamber. Each of drying chamber walls 33, 35, and 36 and cross members 59 are formed of thermally conductive material such as metal for conductive transfer of heat energy from the combustion products in space 44 to grain impinging on cross member 59 in passing downwardly through the drying chamber 32. Cross members 59 herein comprise tubular elements and, as shown in FIG. 4, are arranged in a staggered pattern so as to define serpentine paths, such as shown by the arrow 60 in FIG. 4, for the grain falling downwardly therebetween in drying chamber portion 37.

The front wall 55 of the housing 23 is provided with an apertured plate 61 for admitting combustion air to the burners 43 and cooling air to the space 48 between the insulating walls 42 and the housing side walls 47 and 55 as shown in FIG. 4.

Operation of drier 10 is extremely simple. Combustion fluid is delivered to the burners 48 from a suitable supply (not shown). The operation of the burners is automatically regulated therein by suitable conventional thermostat controls generally designated 62 having a sensing element 63 disposed in the upper portion of drying chamber portion 37. Manual control 28 is set for the grain crop to be dried. Thus, the apparatus has a range of drying temperature of from approximately 200° F. to approximately 550° F., as shown in FIG. 3, which temperatures are correlated by suitable indicia generally designated 64 for correspondingly controlling the operation of the burners 43 by means of a manual control knob 65 associated with thermostat control 62. Thus, as seen in FIG. 3, indicia 64 of control 28 may define control positions of knob 65 suitable for effecting drying temperature in chamber 32 for selectively drying wheat, oats, beans, and corn at the correspondingly different required temperatures. Further, indicia 64 includes legends 66 for indicating desired low, medium and high moisture conditions of the grain and legends 67 for selecting slow or fast operating conditions to be obtained in effecting the drying. As seen in FIG. 3, the control indicia 64 provides a temperature control as an inverse function of the moisture conditions in connection with a grain, such as beans, whereas a direct functional relationship is established with other grains, such as wheat, oats, and corn. It has been found that beans have a concentration of moisture adjacent the center of the individual beans where the moisture content is approximately 18 percent and a concentration adjacent the shell where the moisture content is approximately 21 percent. Thus, it has been found that a higher temperature is necessary to dry the less moist beans. Relative to the other grains, the moisture distribution is such that a conventional increase in the drying temperature is suitable for drying the more moist grain and an increase in temperature is suitable for drying the grain more rapidly as illustrated by the associated legends 66 and 67, with the grains of indicia 64.

Figure 7:
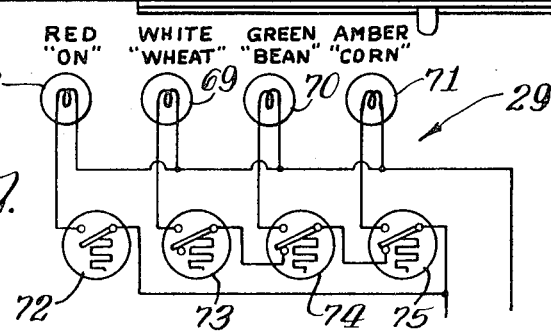
FIG. 7 is a schematic wiring diagram showing the connection of the control indicating lights.

As shown in FIG. 7, indicating means 29 provides an improved indication to the operator of the drier as to the operating conditions thereof. More specifically, indicating means 29 includes four incandescent indicating lamps illustratively including an "On" lamp 68, a "Wheat" lamp 69, a "Bean" lamp 70, and a "Corn" lamp 71. The operation of the lamps may be signalled to the operator by use or different colored lens caps, such as red, white, green, and amber for use with the lamps 68, 69, 70 and 71, respectively. Each lamp is controlled by a separate thermostat switch set to close over a preselected range. Thus, the "On" lamp is controlled by a thermostat switch 72 closed at temperatures upwardly from approximately 150° F. Wheat lamp thermostat switch 73 is arranged to close at relatively low temperatures such as slightly over 200° F. Bean lamp thermostat switch 74 closes at temperatures from approximately 300° F. and Corn lamp thermostat switch 75 closes at temperatures of approximately 375° F.

Thus, grain drier 10 effects an improved drying of grain crops by facilitated moisture removal utilizing both thermal conduction and radiation processes in evaporating the moisture from the crop materials. Improved efficiency in the evaporation is effected by the momentary contact of the grain with the cross members 59 which are heated to the desired temperature by both conduction of heat from the burners 43 through oven wall plates 33, 35 and 36, as well as by radiation from the plates. The plates 33 further heat the air in chamber 32 so as to further transfer heat to the cross members 59 as the heated air moves upwardly therepast and outwardly through duct 41. The momentary contact of the grain with the cross members 59 causes an evaporation or boiling away of the moisture therein without scorching the grain. In the case of beans, the momentary contact effects a transfer of oil from the beans onto the cross members providing a self-cleaning operation further improving the efficiency of the drying operation. To further facilitate thermal transfer, the plates 33, 35 and 36 may be aluminum clad and the tubular cross members may comprise deoxidized copper tubes.

The grain is conventionally allowed to fall by gravity from the discharge duct 20 of the combine and requires only approximately one or two seconds to pass downwardly through the drier during which time the drying to the preselected moisture level is effected. The moisture removed from the grain is discharged from the drier by means of the upwardly rising hot air exhausting through duct 41. It has been found that the temperature of the air in chamber 32 may be somewhat lower in the lower portion thereof than the temperature of the cross members 59 because of the increased heat transfer provided to the cross members by the thermally conducting plates. Thus, the removal of the moisture from the grain is effected primarily by the contact of the grain with the cross members 59 and the hot air serves primarily as the means for discharging the thusly removed moisture from the drier.

The upper portion of housing 23 may be pervious as by inclusion of minuscule openings so as to permit the cooling air in spaces 48 to pass upwardly from the drier. The upward movement of the hot air thus facilitates the cooling air flow by providing a suction effect at the top of the drier adjacent inlet 41. Duct 41 further serves to assure generally a downward movement of the grain entering the drier notwithstanding the delivery of the grain as from combine discharge ducts arranged to discharge the grain at an angle rather than vertically thereby to provide generally uniform conditions in the grain drying operation.

The foregoing disclosure of specific embodiments is illustrative of the broad inventive concepts comprehended by the invention.

I claim:

1. A grain drier comprising: tubular means defining a thermally conductive contacting surface; combustion heating means; wall means heated by the hot combustion gases from said combustion heating means and in thermal transfer association with said tubular means for heating the opposite ends of said tubular means to cause conductive heat flow therefrom to said contacting surface; means for effectively precluding flow of the hot combustion gases from said combustion heating means through said tubular means, said heating means heating said conductive surface to a preselected high temperature over 200° Fahrenheit; means for passing harvested grain into momentary contact with said high temperature contacting surface means for removing moisture from the grain; and means for flowing a heated moisture absorbing gas past the grain to transfer the removed moisture to a discharge point.

2. The grain drier of claim 1 further including means for heating the moisture absorbing gas and passing the heated gas into thermal transfer association with said surface for providing additional heat energy thereto for removing the moisture from the grain.

3. The grain drier of claim 2 wherein the surface is maintained by the heating means at a temperature higher than the temperature of the moisture absorbing gas.

4. A grain drier comprising: means defining a drying chamber having a top inlet and a bottom outlet below said inlet; a plurality of thermally conductive cross members extending across the chamber intermediate said inlet and outlet to be contacted by moist grain falling downwardly through said chamber from said inlet to said outlet, said cross members being staggered to cause the grain to follow a downward serpentine path; combustion heating means; and wall means heated by said heating means for conductively heating said cross members to a temperature in the range of approximately 200° to 500° Fahrenheit for evaporating moisture from said grain as an incident of momentary contact of the grain therewith, said wall means further heating the air in said chamber below said cross members to a temperature lower than the temperature of said cross members for absorbing the moisture freed from the grain by contact thereof with said high temperature cross members.

5. The grain drier of claim 4 wherein said cross members comprise cylindrical tubes.

6. The grain drier of claim 4 wherein said chamber includes thermally conductive wall means adjacent said outlet and said combustion products heat said wall means for heating the air in said chamber to further effect evaporation of moisture from the grain falling through the chamber.

7. The grain drier of claim 6 wherein said means for heating said cross members includes means for conducting heat from said wall means to said cross members for conductively heating the cross members.

8. The grain drier of claim 4 wherein said drying chamber is defined by a bottom wall means inclined downwardly to said outlet and side wall means extending upwardly from said bottom wall means and carrying said cross members, said chamber bottom wall means comprising said wall means heated by said heating means.

9. The grain drier of claim 4 wherein said heating means includes control means and indicia coordinated therewith for guiding operation of the heating means to cause selectively a heating of the grain as a direct function of the amount of moisture therein or as an inverse function of the amount of moisture therein.

10. In a grain drier having a drying chamber through which moist grain is passed for drying of the same, and heating means for providing drying heat to heat said chamber, manually operable control means for controlling said heating means, and indicating means for guiding manual operation of the control means to cause selectively a heating of the grain as a direct function of the amount of moisture therein or as an inverse function of the amount of moisture therein.

11. The grain drier means of claim 10 wherein said control means further comprises indicia means for guiding operation of the heating means to cause selectively a heating of the grain as a direct function of the desired rate of moisture removal.

12. The grain drier means of claim 10 wherein said control means further comprises indicia means for guiding operation of the heating means for suitably drying any one of a plurality of different types of grain having different drying temperature requirements.

13. A grain drier comprising:
first wall means defining a drying chamber having a top inlet and a bottom outlet;
means for heating said wall means for heating said chamber to a grain-drying temperature;
second wall means spaced outwardly about said first wall means;
means for cooling said second wall means; and
a housing spaced outwardly about said second wall means, said means for cooling said second wall means further being arranged to cool said housing whereby said housing may have a temperature of less than approximately 150° Fahrenheit with said drying chamber at a grain-drying temperature of up to approximately 500° Fahrenheit.

14. The grain drier of claim 13 wherein said cooling means comprises means for conducting ambient air flow between said second wall means and said housing.

15. The grain drier of claim 13 wherein said heating means causes hot air flow upwardly through said outlet and said cooling means comprises means for conducting ambient air flow between said second wall means and said housing and discharging adjacent said outlet.

16. The grain drier of claim 13 including spacer means between said first and second wall means for limiting the area of said first wall means directly heated by said heating means.

17. The grain drier of claim 16 further including securing means cooperating with said spacer means for securing said wall means in said spaced relationship.

18. In a grain drier having a drying chamber and means for heating the chamber selectively to a first range of temperature for drying a first grain therein, and a second range of temperature for drying a second grain therein, a means for indicating the operation of the drier in the selected range comprising:
   first and second indicators;
   a first thermostat control responsive to the temperature of said drying chamber being in said first range to operate said first indicator; and
   a second thermostat control responsive to the temperature of said drying chamber being in said second range to operate said second indicator.

19. The grain drier means of claim 18 wherein said indicators are provided with corresponding indicia including selected ones of Wheat, Bean, and Corn indicia.

20. The grain drier means of claim 18 further including an indicator for indicating an "on" condition of the drier

References Cited

UNITED STATES PATENTS

| 1,553,944 | 9/1925 | Laughlin | 34—177 |
| 1,949,427 | 3/1934 | McComb | 34—177 X |
| 2,518,490 | 8/1950 | Parry | 34—41 X |
| 2,606,372 | 8/1952 | Foulder et al. | 34—46 |

JOHN J. CAMBY, Primary Examiner

U.S. Cl. X.R.

34—46, 177